United States Patent [19]

Gooch et al.

[11] 4,372,736
[45] Feb. 8, 1983

[54] ADJUSTABLE ROLLER HEAD EXTRUSION DIE

[75] Inventors: Kendrick J. Gooch, Bethany; Hans R. Scharer, Woodbridge; William Winter, Trumbull, all of Conn.

[73] Assignee: USM Corporation, Farmington, Conn.

[21] Appl. No.: 234,950

[22] Filed: Feb. 17, 1981

[51] Int. Cl.³ .............................................. B29H 5/24
[52] U.S. Cl. ..................................... 425/149; 264/175; 425/192 R; 425/194; 425/367
[58] Field of Search ...................... 264/175, 40.3, 40.4, 264/40.5, 40.7; 425/367, 143, 145, 146, 149, 186, 192 R

[56] References Cited

U.S. PATENT DOCUMENTS

| | | | |
|---|---|---|---|
| 2,971,218 | 2/1961 | Bierer | 425/367 |
| 3,115,672 | 12/1963 | Seanor | 425/367 |
| 3,240,148 | 3/1966 | Varga | 425/367 |
| 3,482,279 | 12/1969 | Anders et al. | 425/192 R |
| 3,535,738 | 10/1970 | Vossen | 425/192 R |
| 3,734,659 | 5/1973 | Harris | 425/367 |
| 3,824,054 | 7/1974 | Harris | 425/367 |
| 3,902,835 | 9/1975 | Theysohn | 425/192 R |
| 3,907,478 | 9/1975 | Vernon et al. | 425/367 |
| 3,936,258 | 2/1976 | Lake | 425/367 |
| 4,127,373 | 11/1978 | Anders et al. | 425/192 R |
| 4,256,448 | 3/1981 | Carle | 425/367 |
| 4,260,578 | 4/1981 | Moody | 264/40.7 |

FOREIGN PATENT DOCUMENTS

| | | | |
|---|---|---|---|
| 2532071 | 3/1976 | Fed. Rep. of Germany | 264/175 |
| 701071 | 2/1966 | Italy | 425/367 |
| 1209467 | 10/1970 | United Kingdom | 264/175 |

*Primary Examiner*—Jay H. Woo
*Attorney, Agent, or Firm*—Vincent A. White

[57] ABSTRACT

A roller head securable to the discharge end of an extrusion machine, wherein the roller head has a pair of rollers each rotatable between a pair of arms pivotable about an axis transverse to the extrusion machine. Each roller is movable with respect to the other roller and to the axis of the extrusion machine by a pair of pressurizable cylinders arranged between the pivotable arms. The rollers are rotatable, even in their separated state, by an articulated drive system which permits roller rotation during machine output and during roller support arm movement. The rollers are permitted to "float" on a hydraulic suspension system utilizing an accumulator wherein the separation of the rollers is dependent upon the volume of extrudite being forced therethrough.

4 Claims, 6 Drawing Figures

4,372,736

ADJUSTABLE ROLLER HEAD EXTRUSION DIE

BACKGROUND OF THE INVENTION (1) Field of the Invention

This invention relates generally to extrusion machines, and more particularly to roller head die arrangements which are adaptable to the discharge ends of extrusion machines.

(2) Prior Art

An extrusion machine with a roller die arrangement may comprise an extruding device in which material is mixed and propelled along the length of a cylinder or barrel, then discharged through an opening in the extrusion machine, where it is introduced between cooperating calender rolls which calender the material to the desired thickness. The process through the extrusion machine begins with the material being dumped from a mixing machine, into a hopper of the extruding machine where it is forced along the length of the extruder barrel by interaction with a rotating screw arrangement supported therewithin. The material is discharged from the extruder barrel in a plastic state under sufficient pressure into the calender rolls which calender the material into a web or sheet. The material is introduced to the rolls in a generally undefined or bulk state.

After completion of the process, any material remaining in the discharge opening and barrel of the extruder machine must be removed since, if it is permitted to stay in the machine, it may degrade, causing contamination of newly produced material, or it may solidify and cause damage to the machine, during subsequent use thereof. Movement of the calender rolls away from the discharge opening would facilitate the cleaning operation. This however, might involve support apparatus and the like for moving the extruder and the rolls apart, as suggested in U.S. Pat. No. 3,895,898. A roller die unit mounted on rails for moving away from the extruder is shown in U.S. Pat. No. 3,274,645 to Chase, and assigned to the assignee of the present invention. Other art showing the roller dies attached to the floor but movable at least partially away from the extruder, is shown in U.S. Pat. No. 3,115,672.

U.S. Pat. No. 3,947,201 to Ellwood, and assigned to the assignee of the present invention shows an extruding and plastic forming apparatus which governs the rate of extrusion flow depending upon feedback from sensors near the rolls. U.S. Pat. No. 4,256,448 to Carle, and also assigned to the assignee of the present invention shows an arrangement of cylinder rolls adapted on a rigid frame attached to an extrusion machine, wherein the rolls are biased obtusely to the direction of plastic flow, permitting non-orthogonal movement of the rolls during high volume flow to permit excess bypass therethrough, and during cleaning of the machine to permit removal of the screw.

There is however, a need for simpler construction of roll supports, which can even permit roll rotation at the point of maximum displacement from one another.

There is also a need for a roller die apparatus which can automatically rapidly compensate and adjust itself for variations in the pumping rate of the extruder without otherwise producing excessive stock pressures between the extruder and the roller die which might damage the machine, without utilizing failure prone electronic circuits.

BRIEF SUMMARY OF THE INVENTION

The present invention comprises a roller die apparatus, known also as a calender, which may be arranged on the discharge portion of an extrusion machine. An upper and a lower roll are pivotally hingable each on a pair of support arms attached to an extrusion machine. Each respective upper and lower arm is pivotally connected to a pressurizable piston and cylinder unit. The piston and cylinder units are preferably arranged upstream from the rolls so as to eliminate any obstruction therearound, and to facilitate withdrawal of the extrusion screw for cleaning purposes. The roller die apparatus also comprises an arrangement of stops which are attached to the frame portion of the apparatus. The stops limit the arcuate travel of the support arms. An adjustment device may be disposed between the support arms to regulate the propinquity of the rolls in their closest operational configuration. The rolls may be rotatable by connecting gears arranged between one another of the rolls, allowing only one roll to be rotatively driven by a motor through a gear reducer and telescoping universal drive shaft. The connecting gears are arranged so as to permit a pivotal separation of the support arms by several degrees while still maintaining engagement with one another. Another embodiment of the invention shows a telescoping universal drive shaft from a gear reducer to each of the rolls in the roller die apparatus, thus permitting a wide separation of the support arms and their respective rolls, while still effecting rotation in those rolls. The apparatus includes a hydraulic circuit having a compensator which permits automatic roll floating, eliminating the need for continuous pump operation to maintain pressure.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figure 1:
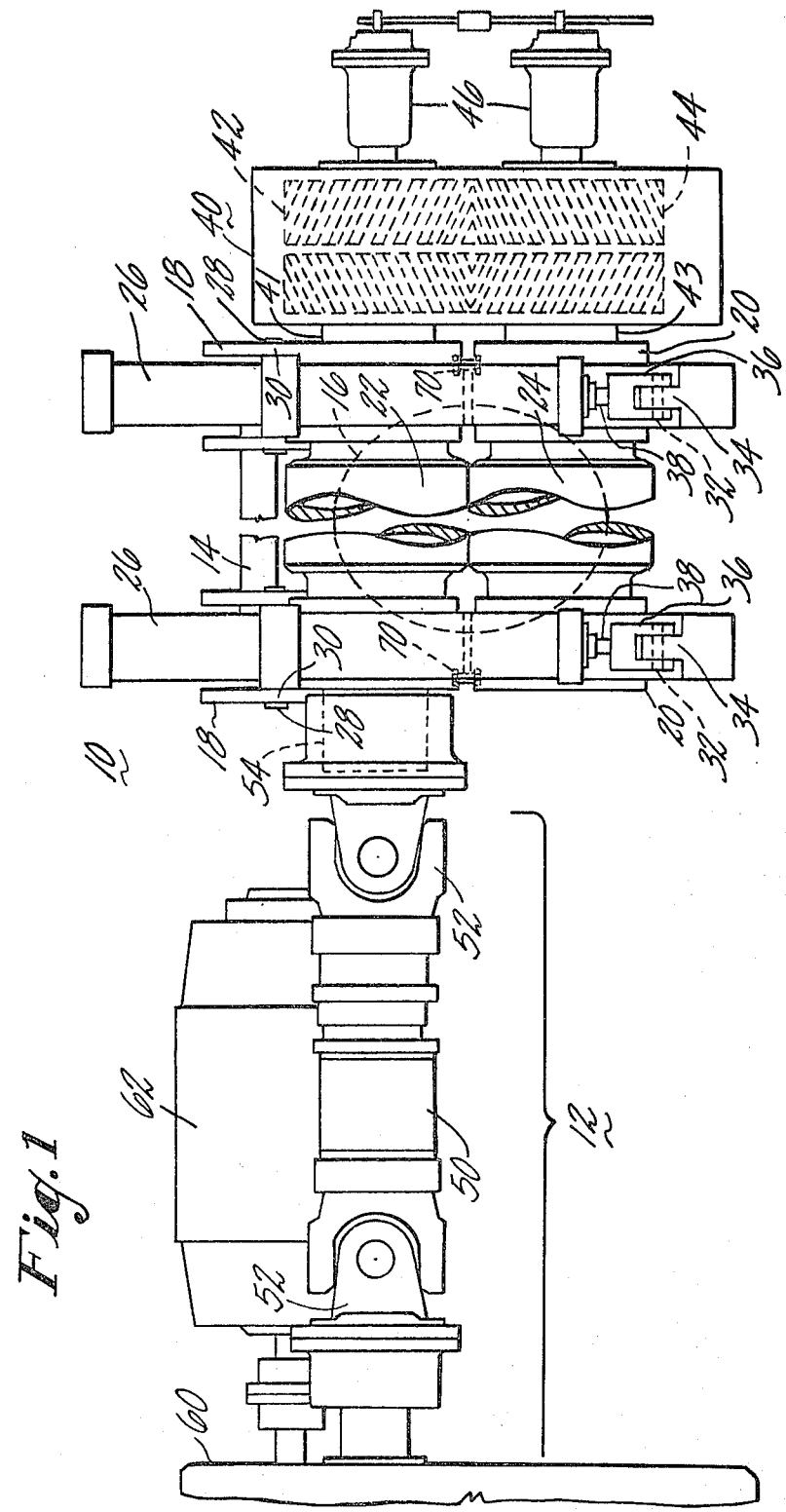
FIG. 1 is an elevational view of a roller die apparatus showing one embodiment of its drive means.
Figure 3:
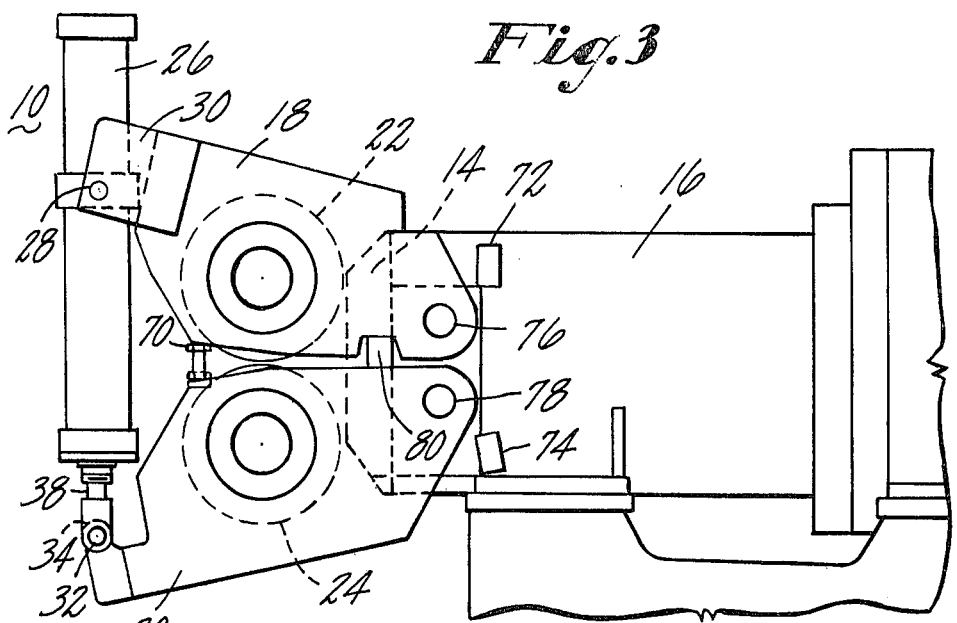
FIG. 3 is a view taken along the lines III—III of FIG. 2.

Referring now to the drawings in detail and particularly to FIGS. 1 and 3 there is shown a roller die machine 10. The roller die machine 10 has a drive system 12 connected thereto, and has a frame portion 14 which is attached to an extrusion machine 16 having an extrusion screw therein. The roller die machine 10 comprises an upper pair of support arms 18 and a lower pair of support arms 20, which between each pair, rotatively carry an upper roll 22 and a lower roll 24, respectively. The upper portion of a pressure regulatable piston and cylinder unit 26 is pivotally disposed on a trunion 28 in a clevis 30 arranged on the distal end of each upper support arm 18, and the lower portion of the piston and cylinder unit 26, comprises a rod 38 attached to a clevis 36 which receives a pin 32 that extends through a gudgeon 34 on the lower support arms 20. The upper roll 22 is journalled in the upper support arms 18 through proper bearings, not shown, and may carry in one embodiment, shown in FIG. 1, a connecting gear assembly 40, comprising an upper gear 42 in pivotable engagement with a lower gear 44. The upper and lower gears, 42 and 44, are attached to an arrangement of upper and lower roll extensions 41 and 43 respectively, which are secured to or are integral with their respective rolls 22 or 24. The lower gear 44 is connected through the lower extension 43 to the lower roll 24, the lower roll 24 being journalled with proper bearings, not shown, in the lower support arms 20. A pair of rotary joints 46 are connected to the distal ends of the upper and lower extensions 41 and 43, which rotary joints 46 feed a heat transfer fluid through the upper and lower extension 41 and 43, into the upper and lower rolls 22 and 24 to effectuate heat transfer therein.

The drive system 12 includes a first drive shaft 50 which has a universal joint 52 arranged at each end thereof, as shown in FIG. 1, one end being connected to a neck 54 which extends from one end of the upper roll 22, through the upper support arm 18. The first drive shaft 50 is splined internally so as to permit a telescoping arrangement which will allow longitudinal extension and contraction thereof while simultaneously providing a rotary motion input into the upper roll 20 at any location on its locus of motion.

Figure 2:
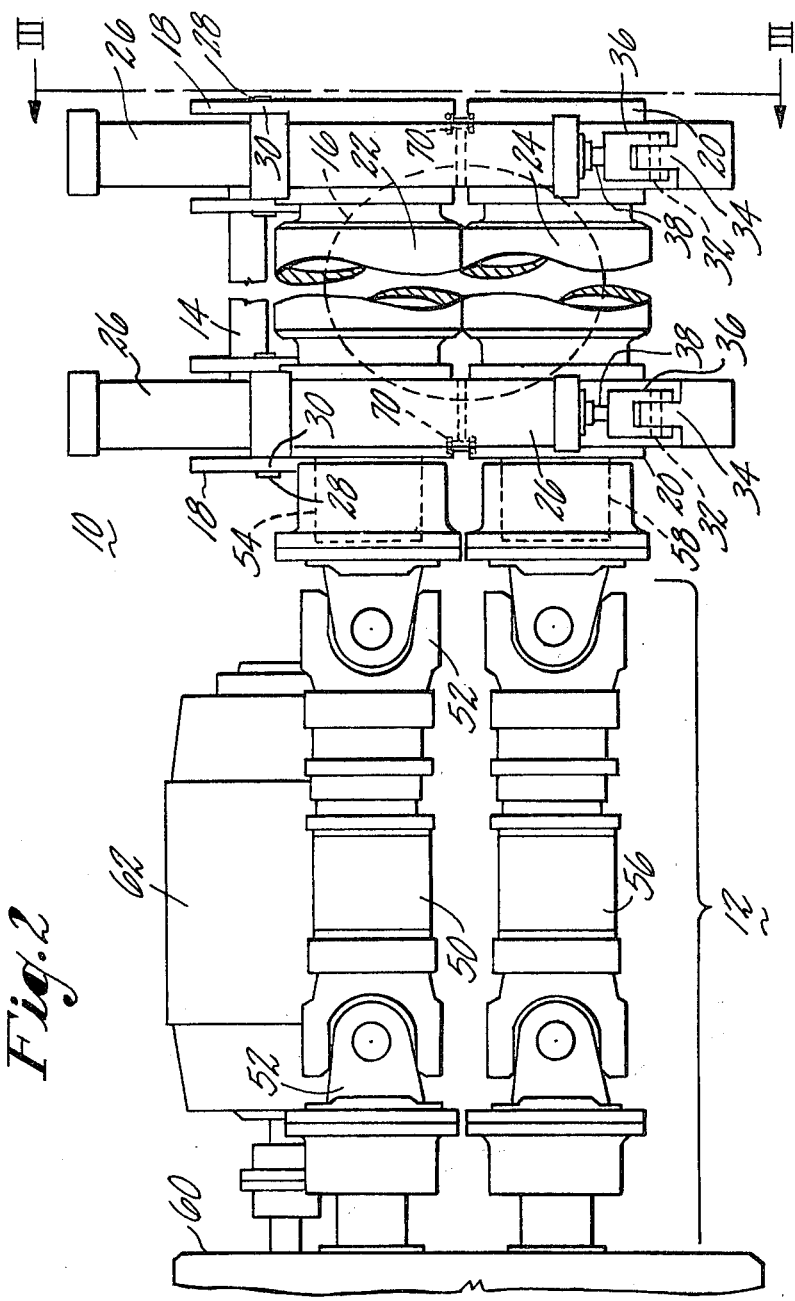
FIG. 2 is an elevational view of a roller die apparatus showing a further embodiment of the drive means.

A second, lower drive shaft 56, in another preferred embodiment as shown in FIG. 2, may be connected to a neck 58 extending from one end of the lower roll 24, to provide rotary motion thereto while maintaining the ability to telescopingly extend and contract itself in a manner similar to the aforementioned first drive shaft 50. A gear reducer 60 is connected to the other end of the first or upper drive shaft 50, and in the second embodiment, the gear reducer 60 is also connected to the appropriate end of the lower drive shaft 56. The gear reducer 60 is connected, through proper linkage, to a motor 62 which provides the rotary motion for the drive system 12 and the roller die machine 10.

Figure 4:
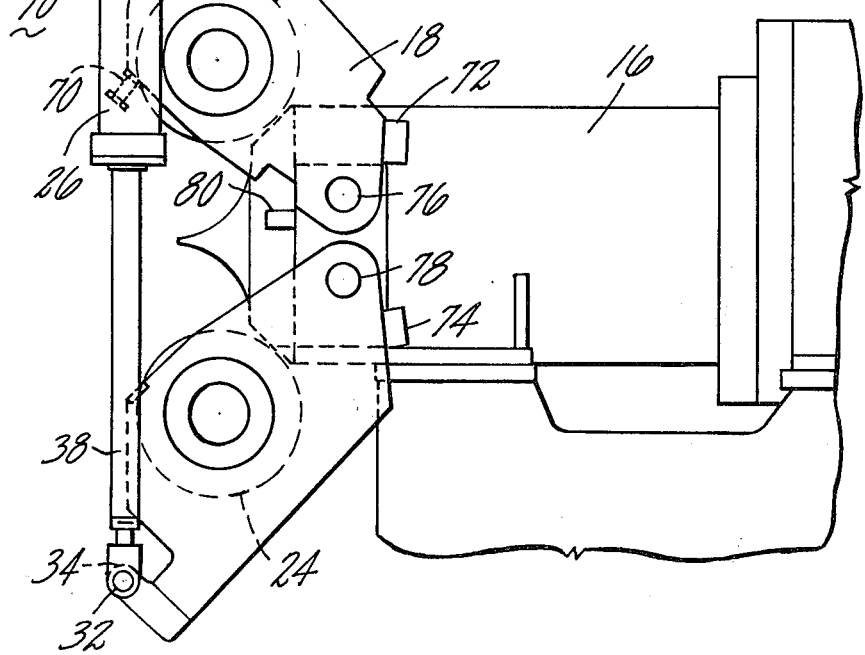
FIG. 4 is a view similar to FIG. 3, showing the rolls in a displaced state from one another.

The roller die machine 10 is shown in FIGS. 3 and 4 in several stages of operation, with portions of the machine removed from the drawing, for clarity of the view. In FIG. 3, the upper and lower rolls 22 and 24 are spaced only slightly apart from one another, as might be the case under normal operating conditions. A pair of gap adjustment screws 70 are arranged between the upper support arm 18 and the lower support arm 20, to permit a minimum regulatable separation between the upper roll 22 and lower roll 24 at close operating positions. Both an upper stop 72 and a lower stop 74 are attached to the frame 14 of the roller die machine 10 to prevent excess arcuate movement of the upper support arm 18 and the lower support arm 20 beyond the points shown in FIG. 4, as the support arms 18 and 20 are caused to pivot about their respective pivot pins 76 and 78 which are secured to the frame 14 of the extrusion machine 16. A minimum clearance stop 80 is shown in FIG. 3 preventing the upper support arm 18 from pivoting further downward about pivot pin 76 and to limit clearance between the rolls 22 and 24 to act as a spacer between the upper and lower arms 18 and 20.

Figure 5:
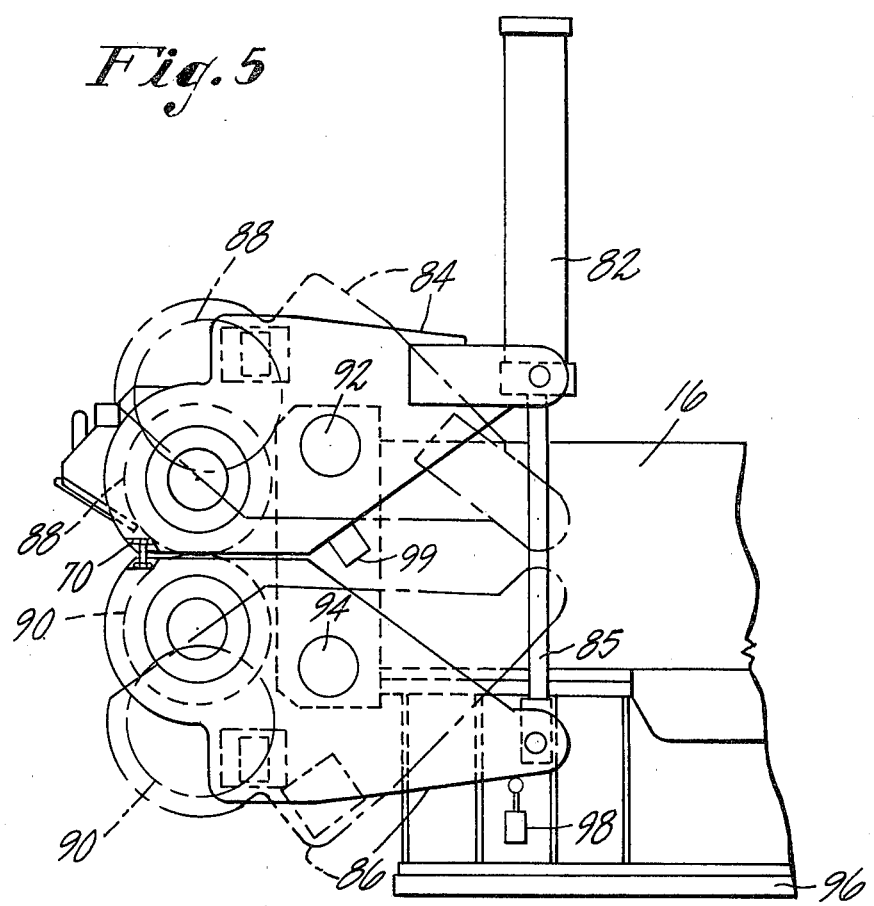
FIG. 5 is a side elevational view of a yet another embodiment of the roller die apparatus.

A further embodiment is shown in FIG. 5, wherein a pair of pressure regulatable piston and cylinder units 82 are shown pivotally arranged between a pair of upper support arms 84 and each having a piston rod 85 pivotally connected with one of a pair of lower support arms 86. The support arms 84 and 86, each carry between them, an upper roll 88 and a lower roll 90, respectively. The piston and cylinder units 82 and the support arms 84 and 86 each pivot about a pair of pivot pins 92 and 94, away from the discharge end of the extrusion machine 16. That is, they are arranged so as to be out of the way of a web as it passes between the upper and lower rolls 88 and 90, and to be out of the way during cleaning or screw removal from the extrusion machine 16. FIG. 5 also shows in phantom lines, the orientation of the upper and lower support arms 84 and 86 when the piston and cylinder units 82 are full retracted to allow for maximum separation between the upper roll 88 and the lower roll 90. The upper support arms 84 and the lower support arms 86 may have a gap adjusting screw 70 between one another as was described in the aforementioned embodiment. The extrusion machine 16 is secured to a base 96 or foundation, shown only in this Figure.

In the embodiment shown in FIG. 2, the telescoping nature of the upper and lower drive shafts 50 and 56 permit rotation of the upper and lower rolls 22 and 24 during separation thereof permitting ready access for cleaning and inspection of the roll surfaces, to allow thick web production from the roller die 10, to allow removal of the screw from the extrusion machine 16, as well as to allow the maintenance of continuity in a web if the upper and lower rolls 22 and 24 had to be separated for some reasons such as momentarily high discharge rate from the extrusion machine 16, which embodiment thus eliminates the need for engaging or reengaging the teeth on associated gear 42 and 44 in the gear assembly 40 as would be required in one of the aforementioned embodiments.

Figure 6:
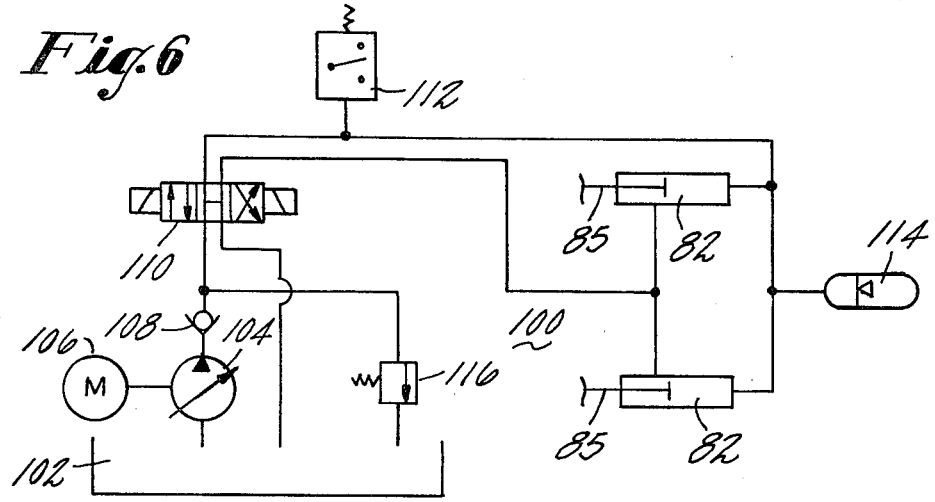
FIG. 6 is a schematic representation of a hydraulic circuit utilized in the present invention.

To separate the upper roll 88 from the lower roll 90 the piston and cylinder units 82 are pressurized accordingly from a hydraulic circuit 100, as shown in FIG. 6, to properly effectuate pivotable movement of the upper and lower support arms 84 and 86 about their respective pivot pins 92 and 94. The hydraulic circuit 100 is alternatively used to close the rolls by forcing the support arms 84 and 86 against each other through the gap adjusting screws 70 to "preload" the rolls at the preselected minimum operating gap. In this mode, rolls will automatically separate or "float" to a position greater than the minimum operating gap if the separating force on the rolls created by the stock passing between the rolls exceeds the hydraulic force forcing the rolls together. The upper support arms 84 rest against a positive stop 99, so that any "float" manifests itself by the movement of the lower support arms 86. The deviation of the operation position of the lower support arms 86 from the minimum operating gap is measured by an electronic position transducer 98.

A hydraulic circuit, similar to that shown in FIG. 6 is used for the embodiment shown in FIG. 1, except that the hydraulic connections are made to the opposite ends of the piston and cylinder unit 26.

The hydraulic circuit 100 comprises a fluid holding tank 102 in communication with a pump 104. The pump 104 is empowered by a motor 106 for preferably intermittant pumping of fluid through a check valve 108 and into a directional valve 110. The directional valve 110 is in communication with both ends of the piston and cylinder units, 82, and has a pressure switch 112 tied into one hydraulic line from the directional valve 110. An accumulator 114 is tied to the hydraulic line between the particular ends of the piston and cylinder units 82, which effectuates the pressure of the upper roll against the lower roll. A relief valve 116 is arranged in the circuit to dump excess fluid back into the holding tank 102. The operation of the hydraulic circuit 100 is such as to permit the pump 104 to preload the piston and cylinder units 82 to any desired pressure between the upper and lower rolls 88 and 90. Once the desired pressure has been reached, the pump is stopped by means of the pressure switch 112, with the pressure being maintained on the piston cylinder unit 82 by means of the accumulator 114.

In operation, a full width sheet of a thickness determined by the minimum roll gap setting set by gap adjusting screw 70 is produced if the roll speed is adjusted to the minimum value at which the force on the rolls from the material pressure in the cavity between the end of the extruder and the rolls, plus the force acting on the rolls as the material passes through the gap between the rolls generates a separating force on the rolls equal to, or less than, the hydraulic force generated by the piston and cylinder units 82 forcing the rolls together. If the roll speed selected is too low, or if the pumping rate of the extruder should gradually or suddenly increase above its previous level to the point where the separating force exceeds the hydraulic force, the rolls will separate slightly under essentially constant force due to oil being forced at essentially constant pressure from the piston and cylinder unit 82 into the accumulator 114, increasing the rate of material discharged through the rolls which will tend to decrease the material pressure in the above-mentioned cavity until the separating force on the rolls again just matches the hydraulic closing force of the rolls.

A roll gap position transducer 98 arranged through the proper circuitry, not shown, may be used to measure the deviation of this new operating gap from the pre-selected minimum gap to permit readjustment of the roll speed, or extruder speed either manually or automatically to bring the operating gap back to the pre-selected value.

When it is desired to separate the upper and lower rolls, the motor and pump 106 and 104 as well as the directional valve 110 are actuated accordingly.

Thus there has been shown a unique device for supporting, moving and automatically floating a pair of calender rolls on the extrusion or discharge location of an extrusion machine, permitting efficient and continuous extrusion of a web therefrom, while permitting dimensional changes thereof to accommodate a change of flow rate of extrudite from the extrusion machine, and to permit an efficient cleaning of the extrusion machine and die rolls as well as facilitating removal of the screw from between the pair of rolls.

We claim:

1. A roller die arrangement for an extrusion machine comprising a pair of opposed rolls mounted at the output end of an extruder, pivoted pairs of arms mounting the rolls at opposite ends for rotation and for bodily swinging movements between an open condition exposing the output end of the extruder and a closed condition in which clearance between the rolls form a roller die for shaping extruded material, piston and cylinder devices acting between the arms at opposite ends of the rolls for swinging the arms between open and closed conditions, fluid pressure means including an accumulator for fluid at a predetermined pressure acting on the piston and cylinder devices to hold the rolls in closed condition under a predetermined pre-load force to maintain the clearance acting on material extruded under a normal pressure, whereby material under greater than normal pressure moves the rolls apart against the pre-load force applied by the fluid pressure in the accumulator to cause the rolls to float on the extruded material.

2. A roller die arrangement according to claim 1 in which the fluid pressure means also includes a pump for supplying fluid under pressure to the accumulator and a device for stopping the pump when fluid in the accumulator is at the predetermined pressure whereby the pre-load force is maintained by the accumulator.

3. A roller die arrangement according to claim 1 in which the rolls are driven in open condition through extensible universal joint drives which follow the opening and closing movements of the rolls.

4. A roller die arrangement according to claim 1 in which stop means locates at least one of the pairs of arms and associated rolls and adjustable means acting between the arms determines the clearance between the rolls in closed condition for locating the floating action of the rolls relative to the output end of the extrusion machine.

* * * * *